(12) United States Patent
Saunders et al.

(10) Patent No.: US 7,036,319 B2
(45) Date of Patent: May 2, 2006

(54) METHOD OF BALANCING THE SUPPLY OF BLEED AIR FROM A PLURALITY OF ENGINES

(75) Inventors: Arthur Frank Saunders, Bridgwater (GB); Mark Russell Carne, Sherbourne (GB)

(73) Assignee: Honeywell Normalair-Garrett (Holdings) Limited, Yeovil ( * ) Notice: Subject to any disclaimer, the term of this patent is extended or adjusted under 35 U.S.C. 154(b) by 79 days.

(21) Appl. No.: 10/681,761

(22) Filed: Oct. 8, 2003

(65) Prior Publication Data

US 2006/0059920 A1 Mar. 23, 2006

(30) Foreign Application Priority Data

Oct. 23, 2002 (GB) .................................. 0224625

(51) Int. Cl.
*F02C 6/08* (2006.01)
(52) U.S. Cl. .......................................... 60/782; 60/785
(58) Field of Classification Search .................. 60/782, 60/785, 794, 801, 802, 795
See application file for complete search history.

(56) References Cited

U.S. PATENT DOCUMENTS 4,779,644 A * 10/1988 Benson ......................... 60/785
5,155,991 A * 10/1992 Bruun .......................... 60/785
6,494,047 B1 * 12/2002 Yeung .......................... 60/782

FOREIGN PATENT DOCUMENTS

GB 2095755 A 10/1982

* cited by examiner

*Primary Examiner*—Louis J. Casaregola
(74) *Attorney, Agent, or Firm*—MacMillan, Sobanski & Todd, LLC

(57) ABSTRACT

A method of balancing the supply of bleed air from a plurality of gas turbine engines, there being an air bleed line from each of the engines to a common distribution line which distributes the bled air to at least one ancillary system, each air bleed line including a control valve which is controllable by a controller to vary the flow rate of air bled from the associated engine, the method including providing to the controller a demand signal indicative of the demand for bleed air by the ancillary system, sensing air pressure in the distribution line and comparing the demand signal with the sensed air pressure to derive a command signal, flow rates the air pressure individually in each of the air bleed lines from the engines with respective air flow rate sensors which provide air flow rate signals to the controller, comparing the air flow rates in each of the air bleed lines to derive individual flow matching signals for each of the engines, comparing each of the flow matching signals to the command signal to derive a drive signal for each of the control valves, and applying the drive signals to the respective control valves.

6 Claims, 2 Drawing Sheets

METHOD OF BALANCING THE SUPPLY OF BLEED AIR FROM A PLURALITY OF ENGINES

BACKGROUND TO THE INVENTION

This invention relates to a method of balancing the supply of bleed air from a plurality of gas turbine engines.

DESCRIPTION OF THE PRIOR ART

It is known to use pressurised air from a gas turbine engine of, for example, an aircraft, in ancillary systems of the aircraft such as for examples only, an air conditioning system or an anti-icing system.

Historically, gas turbine engines were tolerant of bleed air being extracted and thus more than enough pressurised air for the ancillary system or systems was bled from the engine, with surplus pressurised air being discarded. More modern high performance engines are however less tolerant of pressurised air being taken from them; if excess pressurised air is bled from such engines, this is likely to be detrimental to engine performance, and results in an increase in required engine maintenance. Also, discarding excess bleed air has an economic effect.

Accordingly it is desirable for the amount of pressurised air bled from the engines more closely to match demand.

In an aircraft having a plurality of engines, it is desirable that the air bled from each of the engines is matched with equal flow rates to avoid any one engine from supplying all the bleed air whilst the other engine(s) contributes little because otherwise there is a tendency for the amount of bleed air supplied from the engines to diverge. Such difference in flow rates can arise due to differing engine performance or difference in the characteristics of individual regulating valves together with any differences in bleed air pipe length.

In some instances one or more engines may be throttled back resulting in lower bleed pressure being available from that or those engines.

SUMMARY OF THE INVENTION

According to the invention we provide a method of balancing the supply of bleed air from a plurality of gas turbine engines, there being an air bleed line from each of the engines to a common distribution line which distributes the bled air to at least one ancillary system, each air bleed line including a control valve which is controllable by a controller to vary the flow rate of air bled from the associated engine, the method including providing to the controller a demand signal indicative of the demand for bleed air by the ancillary system, sensing air pressure in the distribution line and comparing the demand signal with the sensed air pressure to derive a command signal, sensing the air flow rates individually in each of the air bleed lines from the engines with respective air flow rate sensors which provide air flow rate signals to the controller, comparing the air flow rates in each of the air bleed lines to derive individual flow matching signals for each of the engines, comparing each of the flow matching signals to the command signal to derive a drive signal for each of the control valves, and applying the drive signals to the respective control valves.

Thus utilising the method of the invention, the control valves are individually controlled by the controller so that the flow rates of air bled from individual engines is balanced regardless of differing engine performance and manufacturing tolerances.

In a preferred method, in comparing the bleed air flow rates in each of the air bleed lines to derive individual flow matching signals for each of the engines, the lowest for the time being of the air flow rates is used as a reference with which the air flow rate or rates for the other or others of the engines is compared so that the air flow rate from the other or others of the engines is matched to the air flow rate of the reference.

The lowest bleed air flow rate for the time being used as the reference is preferably determined dynamically so that the available bleed air closely matches demand with minimal surplus air being bled from the engines.

Where there are three or more engines, the method may include sensing that the bleed air flow rate from one of the engines is below a threshold level, providing a drive signal to the relevant control valve to cause the control valve fully to open, and balancing the supplies of bleed air from the remainder of the engines. Thus for example, if one or more of the engines is throttled back, a maximum contribution to the supply of bleed air from that engine or engines is obtained, with the supplies from the remainder of the engines being balanced.

The ancillary system may be an air conditioning system and/or an anti-icing system. The air pressure sensors may be for examples only, venturi or hot wire types of sensors.

BRIEF DESCRIPTION OF THE DRAWINGS

Embodiments of the invention will now be described with reference to the accompanying drawings in which:—

DESCRIPTION OF THE PREFERRED EMBODIMENTS

Figure 1:
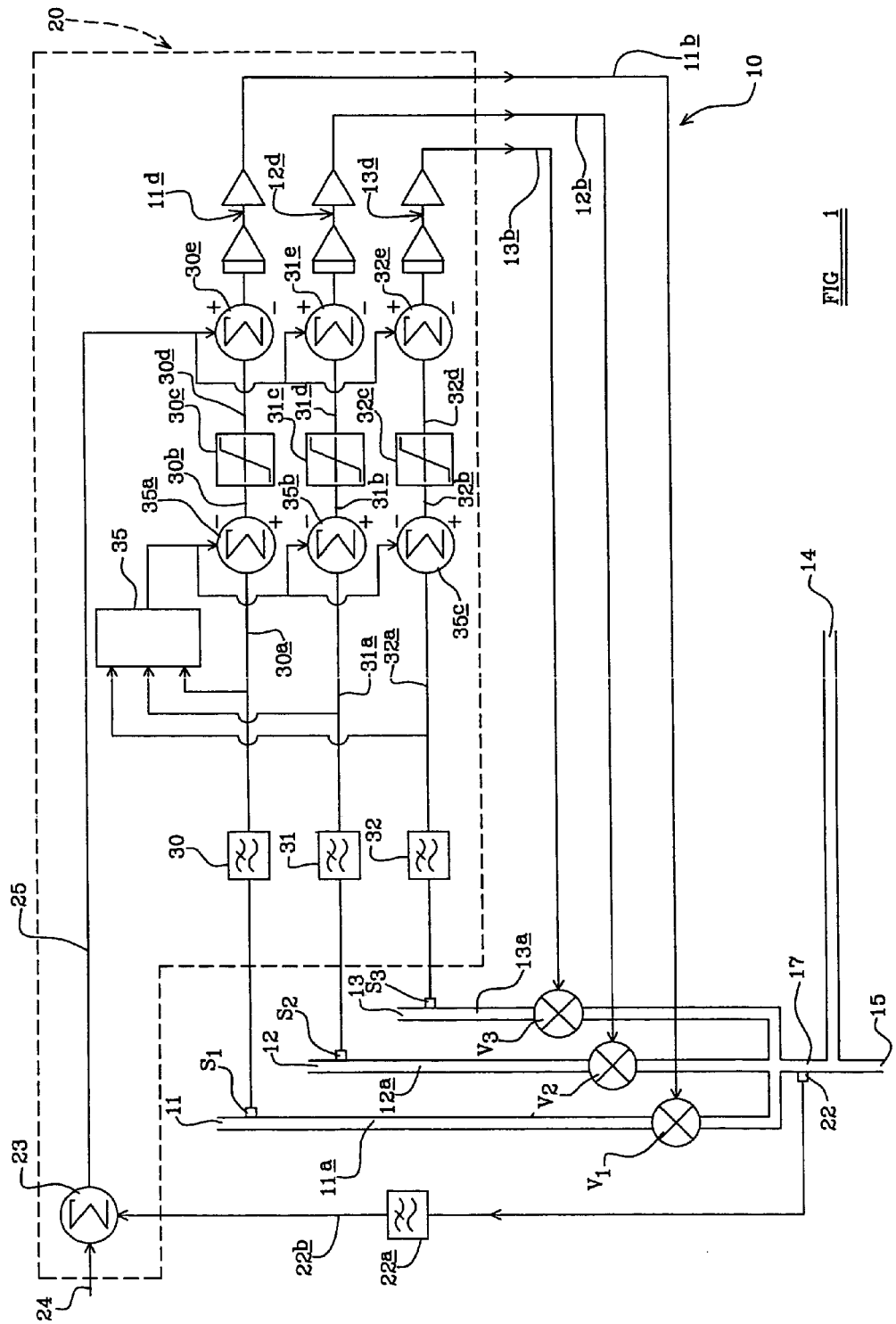
FIG. 1 is an illustrative diagram showing a control system for balancing the supply of bleed air from a plurality of gas turbine engines to which the method of the invention may be performed.

Referring to FIG. 1 there is shown a control system 10 for balancing the supply of bleed air from a plurality of, in this example, three gas turbine engines 11, 12, 13 of an aircraft, although it will be appreciated that the invention need not be applied to aircraft engines but any other multi-gas turbine engine system where a supply of pressurised bleed air is required for an ancillary system.

The bleed air is pressurised and bled for use in an ancillary system, in this example an anti-icing system 14 or an air conditioning system 15, the bled air being available to the anti-icing system 14 and air conditioning system 15 from a common distribution line 17.

The air bled from each of the engines 11, 12, 13 passes along a respective air bleed line 11a, 12a, 13a to the common distribution line 17, via a respective valve V1, V2 or V3, which in this example may be rotary valves capable of metering the air flow, such as butterfly valves, or linear valves as desired. The valves V1, V2 and V3 may be electrically or pneumatically operated, but in each case are controllable by a system controller 20 to control the flow rate of bleed air from the respective air bleed lines 11a, 12a, 13a to the common distribution line 17.

The system 10 includes a pressure sensor 22 to sense the air pressure in the common distribution line 17. The sensor 22 is preferably a transducer which produces an electrical signal indicative of the air pressure in the distribution line 17. The signal is conditioned by a signal conditioner 22a before being supplied along line 22b to a comparator 23 which also receives a pressure demand signal along a line 24 which is indicative of the pressure demand for bleed air from the anti-icing system 14 and air conditioning system 15. The comparator 23 thus produces a command signal along line 25 which is indicative of the difference between the demand for bleed air and the availability of bleed air in the common distribution line 17. It will be appreciated that the signals applied to the comparator 23 should be of the same type in order to produce the command signal on line 25. Thus, if the signal on line 22b is a function of the pressure measured by the sensor 22, then the demand signal on line 24 also should be a function of a pressure demanded by the systems 14 and 15. The command signal on line 25 is not a pressure signal. It is a signal which represents the demand by the systems 12 and 15 for more or less air flow in the common distribution line 17.

The command signal on line 25 is subsequently used to produce drive signals for each of the control valves V1, V2, V3 on lines 11b, 12b, an 13b, as hereinafter explained, so that the control valves V1, V2, V3 are each operated so that, as far as is possible, the flow rates of bleed air supplied from each of the three engines 11, 12, 13 is balanced and so that the pressure in the common distribution line 17 is equal to the demand indicated by the signal on line 24.

The air flow rate in each of the air bleed lines 11a, 12a, 13a is sensed by a suitable flow rate sensor S1, S2, S3, each of which provides a signal to the controller 20 indicative of air flow rate in the respective air bleed line 11a, 12a, 13a.

Each of the signals from the air flow rate sensors S1, S2, S3 is individually processed by a respective signal conditioner 30, 31, 32 and filter to convert the air flow information contained in the respective signal, to a measure of flow rate of the bleed air in the respective air bleed lines 11a, 12a, 13a on respective lines indicated at 30a, 31a and 32a.

The air flow rates thus determined for each of the air bleed lines 11a, 12a, 13a are then compared in a lowest/least select comparator 35 to determine which of the air flow rates sensed by the sensors S1, S2 and S3 in the air bleed lines 11a, 12a, 13a is the lowest for the time being. The lowest/least flow rate is then used as a reference with which the flow rate signals on lines 30a, 31a and 32a are compared to derive individual flow matching signals for the bleed air flows from each of the flow rate error signals 30b, 31b, 32b. The least/lowest flow rate is determined dynamically in use for optimum balancing but may be determined at intervals only as desired.

One of the flow error signals 30b, 31b, 32b, will of course be zero as the reference is compared with itself. Limiters 30c, 31c and 32c constrain the flow rate error signals for control purposes.

The limited flow rate error signals 30d, 31d, 32d are each subtracted from the command signal on line 35 by comparators 30e, 31e and 32e (although one of these, the reference determined by the lowest/least select comparator 35 will be zero) to provide flow matching signals which are then fed to suitable valve drive circuitry 11d, 12d, 13d, to produce respective drive signals provided on lines 11b, 12b, 13b for the respective valves V1, V2, V3, which open/close in response to balance the bleed air flow contributions from the three engines 11, 12, 13 and to satisfy the demand indicated on line 24.

The valve drive circuitry 11d, 12d and 13d may include an integrator and amplifier and may cause ramping up or down of the flow matching signals when the input to the drive circuitry is not zero. Thus, the system is rateless with the pressure sensed by pressure sensor 22 in the common distribution line 17 being adjusted to equal the demand indicated on line 24 in the steady state.

Normally the integral gain in the valve drive circuitry 11d, 12d and 13d is associated with a proportional gain and a derivative gain in a classical PID controller familiar to those versed in the art of control theory. Stabilisation and response optimisation is necessary but is not part of the present invention. Alternative controller 20 architectures are possible dependent on the dynamic requirements. The controller functions may be partitioned into several controllers, one for each engine and/or exhaust.

The resultant air pressure in the distribution line 17 is continuously compared with the demand signal on line 24 in the comparator 23 and the drive signals on lines 11b, 12b, 13b for the valves V1, V2 and V3 are adjusted until the availability of bleed air in the distribution line 17 matches demand. Of course, demand may change, as indicated by the graphs in FIGS. 2a and 2b in which case the command signal on line 25 will change and as a result the valve drive circuitry 11d, 12d, 13d will open/close the valves V1, V2 and V3 appropriately to match the demand.

Figure 2A:
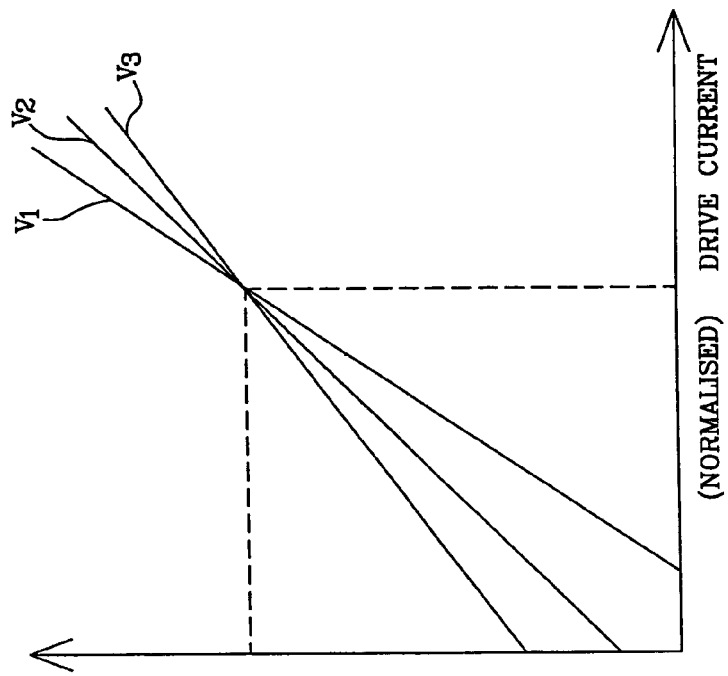
FIG. 2a shows graphically the relationship between valve drive current and air flow rate for each of the engines.

Referring to FIG. 2a, a relationships between air flow and (normalised) drive current for the three valves V1, V2 and V3 are shown. Because of differing engine 11, 12, 13 performance and manufacturing tolerances in the system 10, the relationship is different for each valve V1, V2 and V3. In FIG. 2a, for example, only limited air is required, e.g. the air conditioning system 15 is operating. As demand increases, for example because the anti-icing system 14 is brought on line, then this will result in an increase in a magnitude of the command signal on line 25 requiring an increase on drive current indicated at $x^1$. However, if the drive currents to all three of the valves V1, V2 and V3 are similarly increased, the air flow rates V1, V2 and V3 for the three valves will be different as indicated by the lines f1, f2 and f3 in the figure.

Figure 2B:
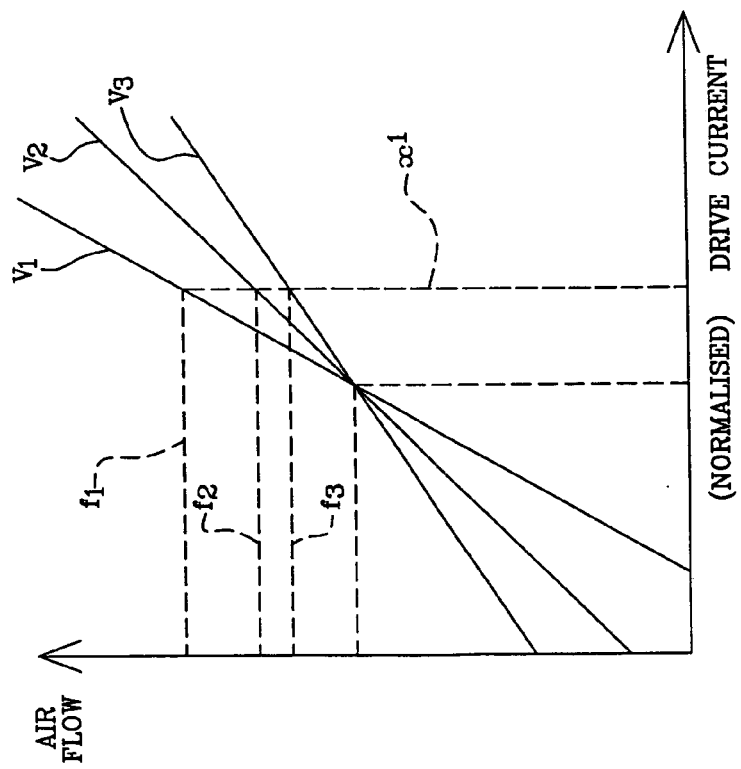
FIG. 2b is a graph similar to that of FIG. 2a but where there is an increased demand for bleed air.

However, after a very short time, by performing the method of the invention, the air flow rates delivered by the three valves V1, V2 and V3 can be balanced as indicated in FIG. 2b by adjusting the drive current to each of the three valves V1, V2 and V3.

In the example shown and described with reference to FIG. 1, the pressure sensor 22 in the common distribution line 17 and the flow rate sensors S1, S2 and S3 in the bleed air lines 11a, 12a, 13a may be venturi, hot wire or any other kinds of sensors as desired, which preferably are transducers which produce electrical signals to the controller 20 indicative of sensed pressure flow rate.

The particular electronic scheme indicated in FIG. 1 is only an example of a scheme which may be utilised to enable the command signal on line 25 to be applied to each of the valves V1, V2 and V3, but corrected to balance the rates of bleed air flow contributed by each of the engines 11, 12, 13.

If desired, particularly but not exclusively for a four or more engined system, it may be desirable in use to throttle back one or more of the engines, for example during landing of the aircraft or during cruise. Thus the contribution to bleed air flow in the system 10 may decrease significantly. In order to prevent the contributions from the remaining engines from decreasing to match the low air flow from the throttled back engine, which would most likely result in insufficient air being available to the anti-icing system 14 or air conditioning system 15, desirably the controller 20, in response to the airflow contribution from any one engine 11,

12, 13 decreasing below a predetermined threshold, the controller 20 responds by fully opening the respective control valve V1, V2, V3, so that a maximum contribution of air flow from the throttled back engine is achieved, and the controller 20 balances the contributions to bleed air flow from the remaining non-throttled back engines 11, 12,13.

It is also realised that along with pressure the temperature of the bleed air may be used to calculate the mass flow of bleed air for the purpose of balancing flow.

The invention claimed is:

1. A method of balancing the supply of bleed air from a plurality of gas turbine engines, there being an air bleed line from each of the engines to a common distribution line which distributes the bled air to at least one ancillary system, each air bleed line including a control valve which is controllable by a controller to vary the flow rate of air bled from the associated engine, the method including providing to the controller a demand signal indicative of the demand for bleed air by the ancillary system, sensing air pressure in the distribution line and comparing the demand signal with the sensed air pressure to derive a command signal, sensing the air flow rates individually in each of the air bleed lines from the engines with respective flow rates sensors which provide air flow rates signals to the controller, comparing the air flow rates in each of the air bleed lines to each other to derive individual flow matching signals for balancing the air flow rate for each of the engines, comparing each of the flow matching signals to the command signal to derive a drive signal for each of the control valves, and applying the drive signals to the respective control valves.

2. A method according to claim 1 wherein in comparing the air flow rates in each of the air bleed lines to each other to derive individual flow matching signals for each of the engines, the lowest of the compared air flow rates for the time being is used as a reference with which the air flow rate or rates for the other or others of the engines is compared so that the air flow rate from the other or others of the engines is readjusted to match the air flow rate of the reference.

3. A method according to claim 2 wherein the lowest air flow rate for the time being is determined dynamically.

4. A method according to claim 1 wherein there are three or more engines, the method including sensing when the bleed air flow rate from one of the engines is below a threshold level, providing a control signal to the relevant control valve to cause the control valve to open fully, and balancing the supplies of bleed air from the remainder of the engines.

5. A method according to claim 1 wherein the ancillary system is an air conditioning system and/or an anti-icing system.

6. A method according to claim 1 wherein the or at least one of the air flow rate sensors is one of a venturi or hot wire type of sensors.

* * * * *